United States Patent
Anton

(10) Patent No.: US 11,231,052 B2
(45) Date of Patent: Jan. 25, 2022

(54) CONTROL DEVICE

(71) Applicant: HYDAC MOBILHYDRAULIK GMBH, Sulzbach/Saar (DE)

(72) Inventor: Marc Anton, Völklingen (DE)

(73) Assignee: HYDAC MOBILHYDRAULIK GMBH, Sulzbach/Saar (DE)

( * ) Notice: Subject to any disclaimer, the term of this patent is extended or adjusted under 35 U.S.C. 154(b) by 0 days.

(21) Appl. No.: 16/973,208

(22) PCT Filed: Jun. 6, 2019

(86) PCT No.: PCT/EP2019/064849
§ 371 (c)(1),
(2) Date: Dec. 8, 2020

(87) PCT Pub. No.: WO2019/238534
PCT Pub. Date: Dec. 19, 2019

(65) Prior Publication Data
US 2021/0262491 A1    Aug. 26, 2021

(30) Foreign Application Priority Data
Jun. 13, 2018  (DE) .................. 10 2018 004 769.6

(51) Int. Cl.
*F15B 1/02*       (2006.01)
*B60G 17/056*     (2006.01)
(Continued)

(52) U.S. Cl.
CPC .............. *F15B 1/02* (2013.01); *B60G 17/056* (2013.01); *F15B 13/04* (2013.01); *F15B 13/044* (2013.01)

(58) Field of Classification Search
CPC ...... F15B 1/02; F15B 13/044; F15B 13/0444; F15B 13/0416; F15B 13/0417
See application file for complete search history.

(56) References Cited

U.S. PATENT DOCUMENTS 5,722,460 A * 3/1998 Olsen .................. F15B 13/0402
                                                    137/625.65
6,247,494 B1 * 6/2001 Deininger ............... F15B 13/01
                                                    137/596.17
(Continued)

FOREIGN PATENT DOCUMENTS

DE    88 04 060      4/1989
DE    38 16 572     11/1989
(Continued)

OTHER PUBLICATIONS

International Search Report (ISR) dated Aug. 16, 2019 in International (PCT) Application No. PCT/EP2019/064849.

*Primary Examiner* — Thomas E Lazo
(74) *Attorney, Agent, or Firm* — Wenderoth, Lind & Ponack, L.L.P.

(57) ABSTRACT

A control device for controlling a hydraulic consumer (2), such as a working cylinder, has at least one control valve (18) having a control spool (20). Control spool (20) is guided in a valve housing (22) in a longitudinally movable manner and is actuated by an electric motor (24). Electric motor (24) can be controlled by control electronics (MC), which receive input signals from a sensor device (58, 60, 62) detecting at least one operating state of the consumer (2).

11 Claims, 8 Drawing Sheets

(51) Int. Cl.
  *F15B 13/04*   (2006.01)
  *F15B 13/044*  (2006.01)

(56) References Cited

U.S. PATENT DOCUMENTS

| | | | |
|---|---|---|---|
| 6,854,270 B2 * | 2/2005 | Zenker | E02F 9/2207 60/422 |
| 7,591,448 B2 * | 9/2009 | Martin | F15B 13/0402 137/884 |
| 8,020,485 B2 * | 9/2011 | Jessen | E02F 9/2228 91/435 |
| 9,200,647 B2 * | 12/2015 | Jadhav | F15B 11/163 |
| 2003/0205128 A1 | 11/2003 | Zenker et al. | |
| 2009/0051130 A1 * | 2/2009 | Huth | B60G 17/056 280/5.514 |
| 2014/0352524 A1 * | 12/2014 | Mullen | F15B 13/0406 91/459 |
| 2017/0328380 A1 * | 11/2017 | Coolidge | F16K 31/1223 |
| 2020/0300275 A1 * | 9/2020 | Biwersi | H02K 7/116 |

FOREIGN PATENT DOCUMENTS

| | | |
|---|---|---|
| DE | 199 09 712 | 9/2000 |
| DE | 10 2004 040 636 | 2/2006 |
| DE | 10 2015 015 685 | 6/2017 |
| EP | 2 466 154 | 6/2012 |

\* cited by examiner

US 11,231,052 B2

CONTROL DEVICE

FIELD OF THE INVENTION

The invention relates to a control device for controlling a hydraulic consumer, such as a working cylinder. In particular, the invention relates to the control of working cylinders, which can be used in vehicles being subject to changing load conditions and having a hydropneumatic suspension system as a level control system.

BACKGROUND OF THE INVENTION

Control devices of this type are state of the art, for example, DE 10 2004 040 636 A1. The known solution provides two line main branches for supplying the respective working cylinders in the form of a suspension cylinder. The line main branches are connected to the annular chamber or the piston chamber of the respective working cylinders in the form of a suspension cylinder. Three switching valves, one of which is electromagnetically actuated, and a pressure control valve are installed in the main branches extending between a pump port and a tank port for the controlled pressure supply of the respective annular chamber and piston chamber. Because four valves are used, the known solution has the disadvantage of high manufacturing cost and requires considerable effort to operate several valves including the control of two valve solenoids.

SUMMARY OF THE INVENTION

Based on this state of the art, the invention addresses the problem of providing a control device of the type mentioned above, which is characterized by a low-cost construction and can be operated applying little control effort, in particular when used to control a working cylinder used as a level control system.

According to the invention, this problem is basically solved by a control device for controlling a hydraulic consumer, such as a working cylinder, comprising of at least one control valve having a control spool. The control spool is guided in a valve housing in a longitudinally movable manner, can be actuated by an electric motor and can be controlled by control electronics. The control electronics receive input signals from a sensor device that detects at least one operating state of the consumer. Because the functions of three switching valves and one pressure control valve are taken over by a spool valve that can be actuated by an electric motor, the cost of cost-intensive components is reduced. The control effort is also simplified, because only the electric motor of the spool valve has to be controlled and not three independent valves, including two actuating magnets. This control device also provides the option of implementing the control device as a unit having integrated control electronics. The wiring effort compared to the known solution is also reduced in this way.

In an advantageous embodiment of the control device, there is at least one pressure supply port, one return port on the input side of the valve housing, at least two utility ports for the hydraulic consumer and two control ports for the connection of hydraulically unlockable valves, in particular check valves, on the output side.

In addition to the existing ports a load sensing port can be provided on the inlet side of the valve housing for controlling a regulating pump, which is used to generate pressure for the pressure supply port.

In particularly advantageous embodiments, the electric motor actuating the spool of the control valve is a brushless DC motor, which actuates the spool by a rack and pinion drive. Advantageously, the electromotive actuation of the control spool can be formed as shown in DE 10 2015 015 685 A1 for the control spool of a LS directional valve. In accordance with this solution, in an advantageous embodiment of the invention, the electric motor is arranged on the valve housing such that its drive axis perpendicularly intersects the travel axis of the control spool and a pinion, located at the end of the motor shaft. The pinion is in engagement with a rack connected to the control spool within a housing chamber. For the control of the stepper motor, as shown in the document mentioned above, an electronics housing is attached to the motor housing to accommodate an electronics board. The electronics board may have a digital controller that detects the rotational position of the motor, for example, by sensorless position measurement. The control may be performed via a CAN bus.

The sensor device, provided for the detection of operating conditions of the consumer, may have at least one sensor, which is used for the detection of displacement and/or of speed and/or of pressure.

A working cylinder, provided as a hydraulic consumer, may have a piston-rod unit, which can be moved in a cylinder housing and which divides the cylinder housing into an annular chamber and a piston chamber. The annular chamber can be connected to one of the utility ports, the piston chamber can be connected to the other utility port, in fluid-conveying manners.

Advantageously, the sensor device has two pressure sensors, which measure the pressure in the annular chamber and the pressure in the piston chamber.

In accordance with the device provided for in the aforementioned document DE 10 2015 015 685 A1, the arrangement in an embodiment may be such that in a middle position, supported by an energy storage device, such as a compression spring, all ports on the output side of the valve housing are shut off from the pressure supply port.

In that case, the arrangement can further be such that, on both sides of the middle position, the control spool performs two further control functions, i.e. a switching position for retracting the piston-rod unit, a switching position for charging the annular chamber, a switching position for charging the piston chamber and a switching position for extending the piston-rod unit.

If the hydraulic consumer is formed as a suspension cylinder of a level control system in vehicles, the annular chamber and the piston chamber can be connected to one hydraulic accumulator each.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
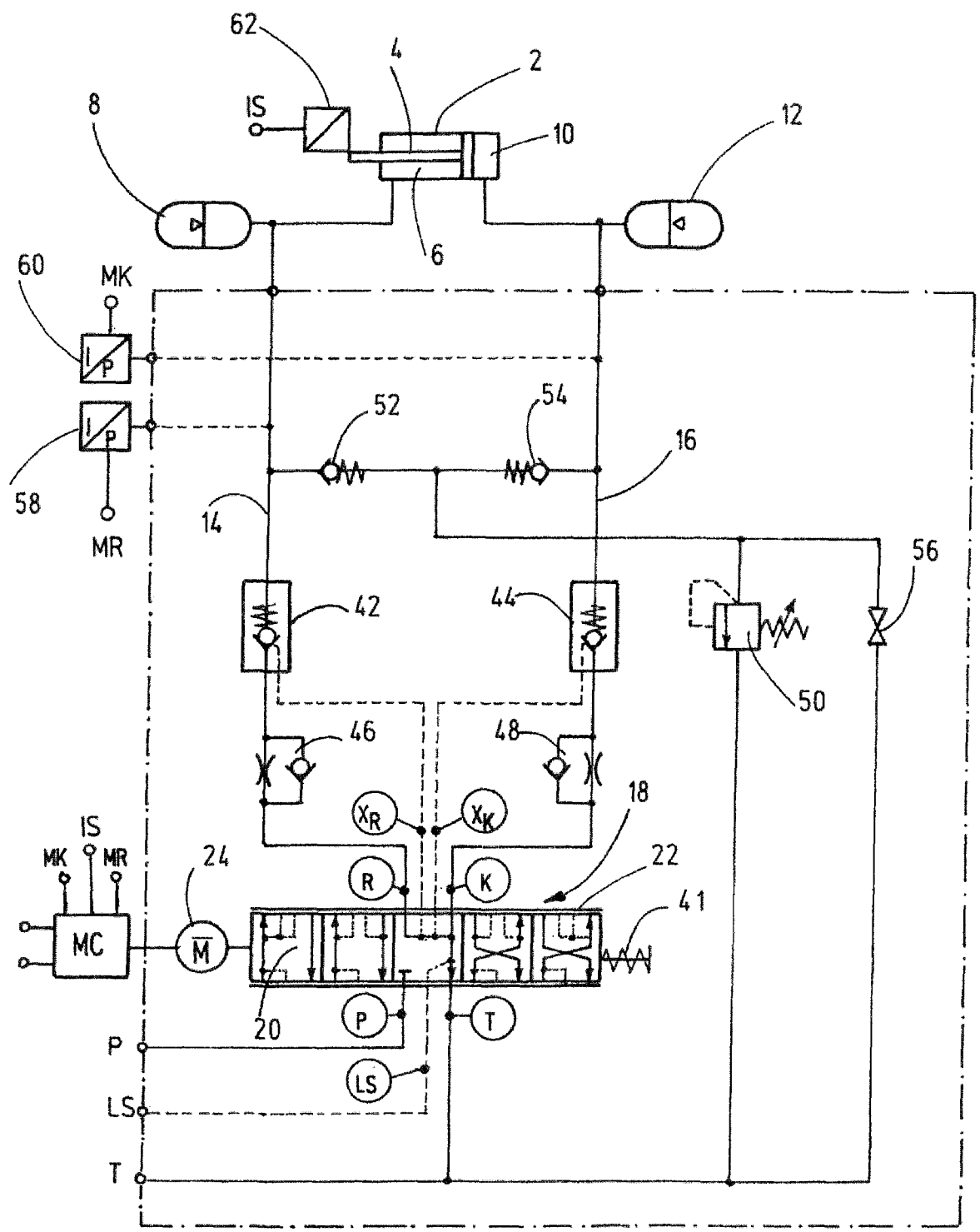
FIG. 1 is a schematic hydraulic circuit diagram of a control device according to an exemplary embodiment of the invention.

With reference to the attached drawings, the control device according to the invention is explained based on the example of the control of a hydraulic consumer in the form of a suspension cylinder 2, which is part of the level control system of a vehicle. The piston rod 4 of the suspension cylinder 2 is loaded by varying axle loads during driving. The control device according to the invention is equally suitable for the control of hydraulic consumers for other purposes. To function as a suspension element, the annular chamber 6 of the cylinder 2 is connected to a hydraulic accumulator 8 and the piston chamber 10 of the cylinder 2 is connected to a hydraulic accumulator 12. A first line main branch 14 is used to supply the annular chamber 6, and a second line main branch 16 is used to supply the piston chamber 10 with pressure. Each of the line main branches 14, 16 establishes a connection to the output side of a control valve 18.

Figure 2:
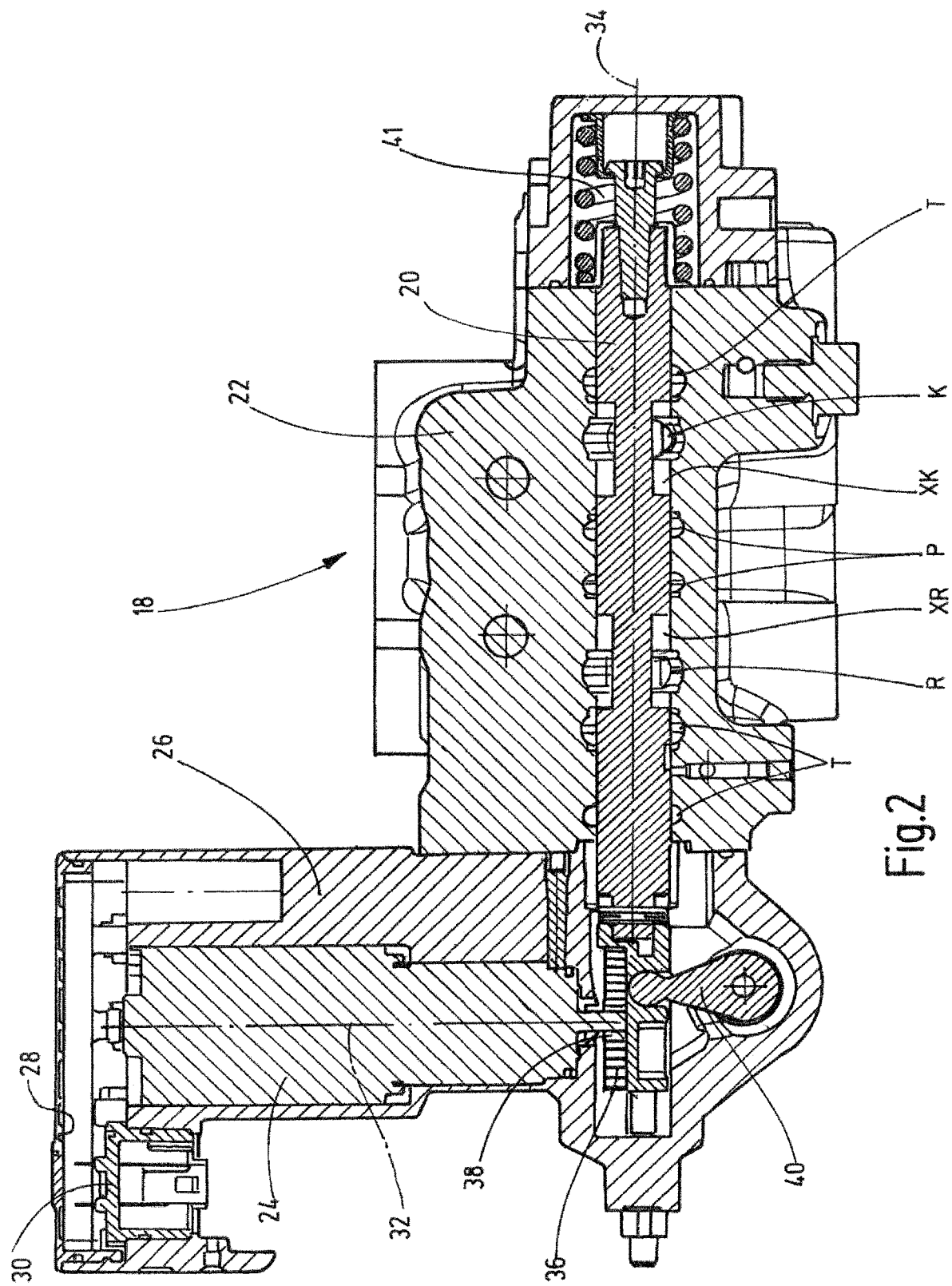
FIG. 2 is a side view in section of the control valve of the control device of the exemplary embodiment, with the assigned electric motor-driven actuation unit.

The control valve 18 is a proportional spool valve, the control spool 20 of which can be longitudinally moved in a valve housing 22 by an electric motor 24. On the whole, the construction of the spool valve and of its electromotive actuation, as shown in FIG. 2, matches the construction of the valve device shown in DE 10 2015 015 685 A1, to which reference is made. The electric motor 24 is a brushless direct current motor, which is controlled as a stepper motor by a digital controller MC (FIG. 1). The controller is integrated into the motor housing 26, which for this purpose has an extension forming an electronics housing 28. In that extension, the circuit board 30 of the controller MC is located. The controller detects the rotational position of the motor 24, for example, by using sensorless position measurement (determination of rotor position by motor winding). The control can be done by the on-board electronics of the associated vehicle via a CAN bus or an analog input signal.

As shown in FIG. 2, the motor housing 26 is flanged to the left end of the valve housing 22 in such a way that the drive axis 32 of the motor 24 is perpendicular to the travelling axis 34 of the control spool 20 and that the end area (on the left in FIG. 2) of the control spool 20 extends into the motor housing 26. To this end area, a rack 36 is attached to the control spool 20. With rack 36, a toothed pinion 38, arranged on the drive axis 32, meshes. This end area of the control spool 20 also interacts with an actuating part 40 of an emergency actuation, which can be of simple construction, because the electric motor drive has practically no self-locking effect. A pressure spring 41, acting on the opposite end of the control spool 20, provides a center position for the spool 20 as shown in FIG. 2.

As can be seen most clearly in FIGS. 1 and 3a to 3e, the valve housing 22 has at its inlet side a pressure supply port P, a return port T and a load sensing port LS. On the output side there are two utility ports R and K for the supply of the cylinder 2 via the line main branches 14 and 16. Furthermore, there are the control ports XR and XK on the output side, which are provided for the hydraulic unlocking of unlockable check valves 42 and 44. The check valve 42 is inserted into the first main branch 14, and the check valve 44 is inserted into the second main branch 16. In addition, a throttle check valve 46 is inserted into the main branch 14 and a throttle check valve 48 is inserted into the main branch 16. Both the unlockable check valves 42 and 44 and the throttle check valves 46 and 48 each lock or close in the direction of the control valve 18. A pressure relief valve 50 is used to protect both main branches 14 and 16 against overpressure towards the return port T and is connected to the main branches 14 and 16 via the check valves 52 and 54. Each of the check valves 52 and 54 opens in the direction of the pressure relief valve 50. A drain valve 56, which is inserted between the pressure side of the pressure relief valve 50 and the return port T, completes the hydraulic circuit.

During operation for setting the control valve 18 to the switching positions, the controller MC receives from a pressure sensor 58 a pressure signal MR representing the pressure in the annular chamber 6, and from a pressure sensor 60 a pressure signal MK representing the pressure in the piston chamber 10. A displacement sensor 62 on the cylinder 2 provides a position signal IS. Depending on the input signals, the control spool 20 is on both sides of the center position adjustable to two further switching positions each, which are shown separately in FIGS. 3a to 3e and FIGS. 4 to 8. Of these, FIGS. 3c and 6, as well as FIG. 1, show the center position. In this position, the pressure supply port P is shut off on the inlet side, whereas all other ports on the inlet side and on the outlet side are connected to the return port T. Because the control ports XR and XK are then depressurized, the unlockable check valves 42 and 44 are not unlocked or opened, and the main branches 14 and 16 are shut off or closed. The annular chamber 6 and the piston chamber 10 of the cylinder then are only connected to the accumulators 8 and 12, respectively, so that the cylinder 2 merely performs the spring function.

Figure 3:
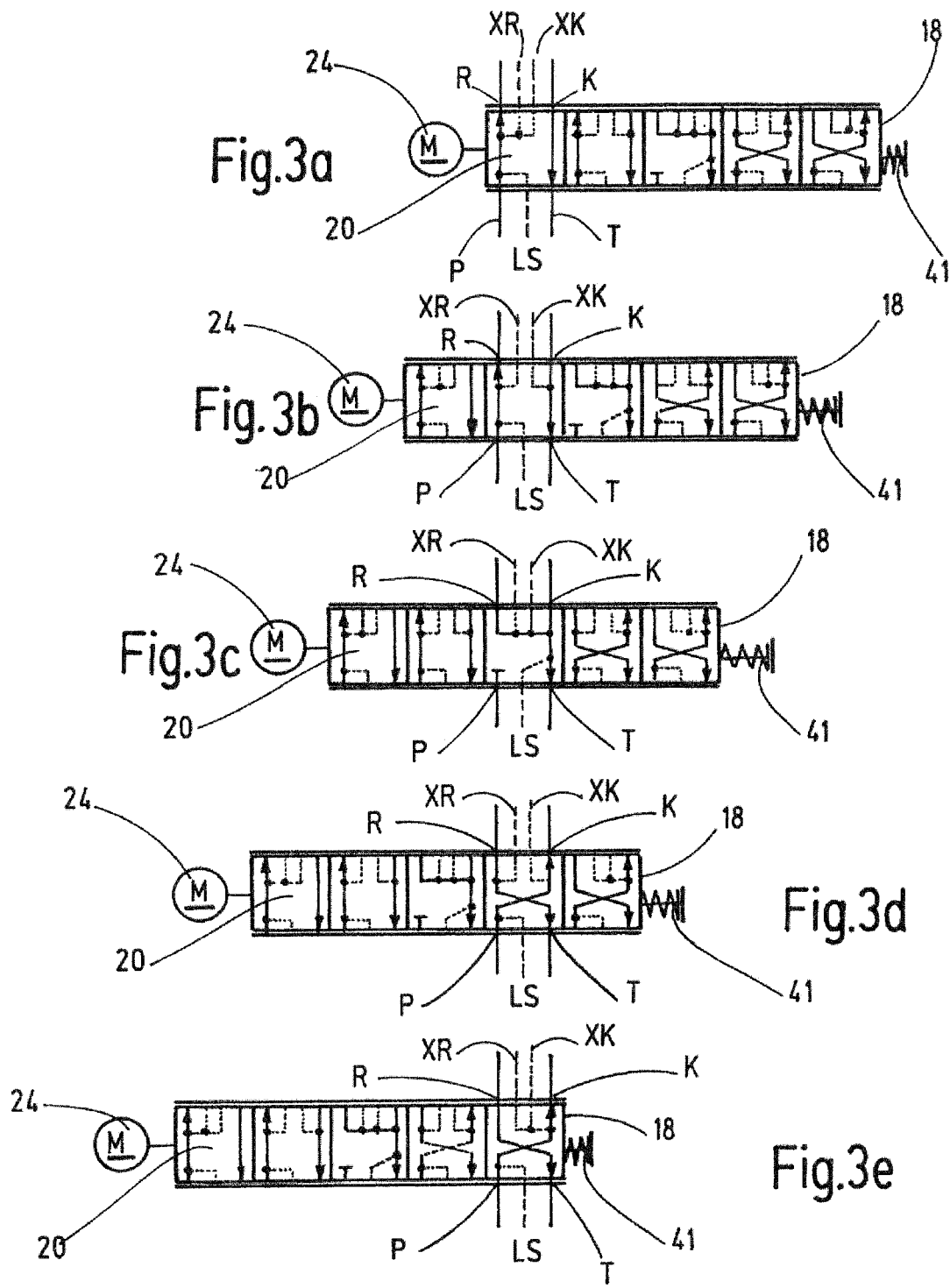
FIGS. 3a to 3e each show a schematic circuit diagram of the control valve separately, wherein five positions of the control spool corresponding to different control functions are shown.
Figure 4:
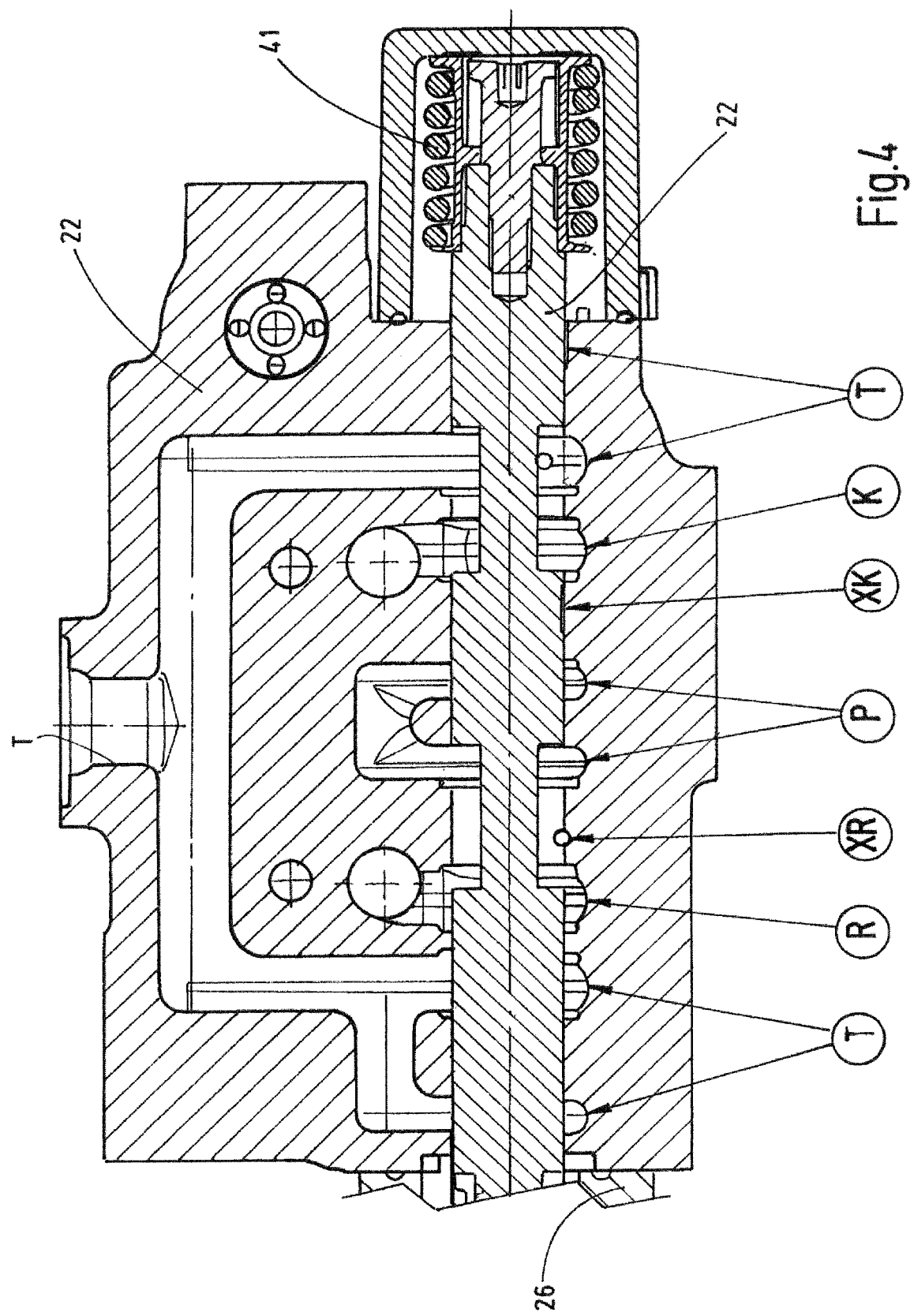
FIG. 4 is a partial side view in section of the valve housing, enlarged compared to FIG. 2, without the assigned actuation unit, wherein the control spool is arranged in the "lowering" position.

FIGS. 3a and 4 show the switching position of the control spool 20, starting from the center position shifted to the right by two steps. In this position marked +2, the utility port K on the output side is connected to the return port T, whereas all other ports are connected to the pressure supply port P. Because both control ports XR and XK are pressurized, the check valves 42 and 44 are unlocked or opened. The piston chamber 10 is connected to the return flow in a throttled manner via the second main branch 16 and the throttle check valve 48, whereas the annular chamber 6 of the cylinder is connected to the pressure supply port P via the throttle check valve 46 and the unlocked check valve 42, so that the switching position +2 corresponds to the function "lowering".

Figure 5:
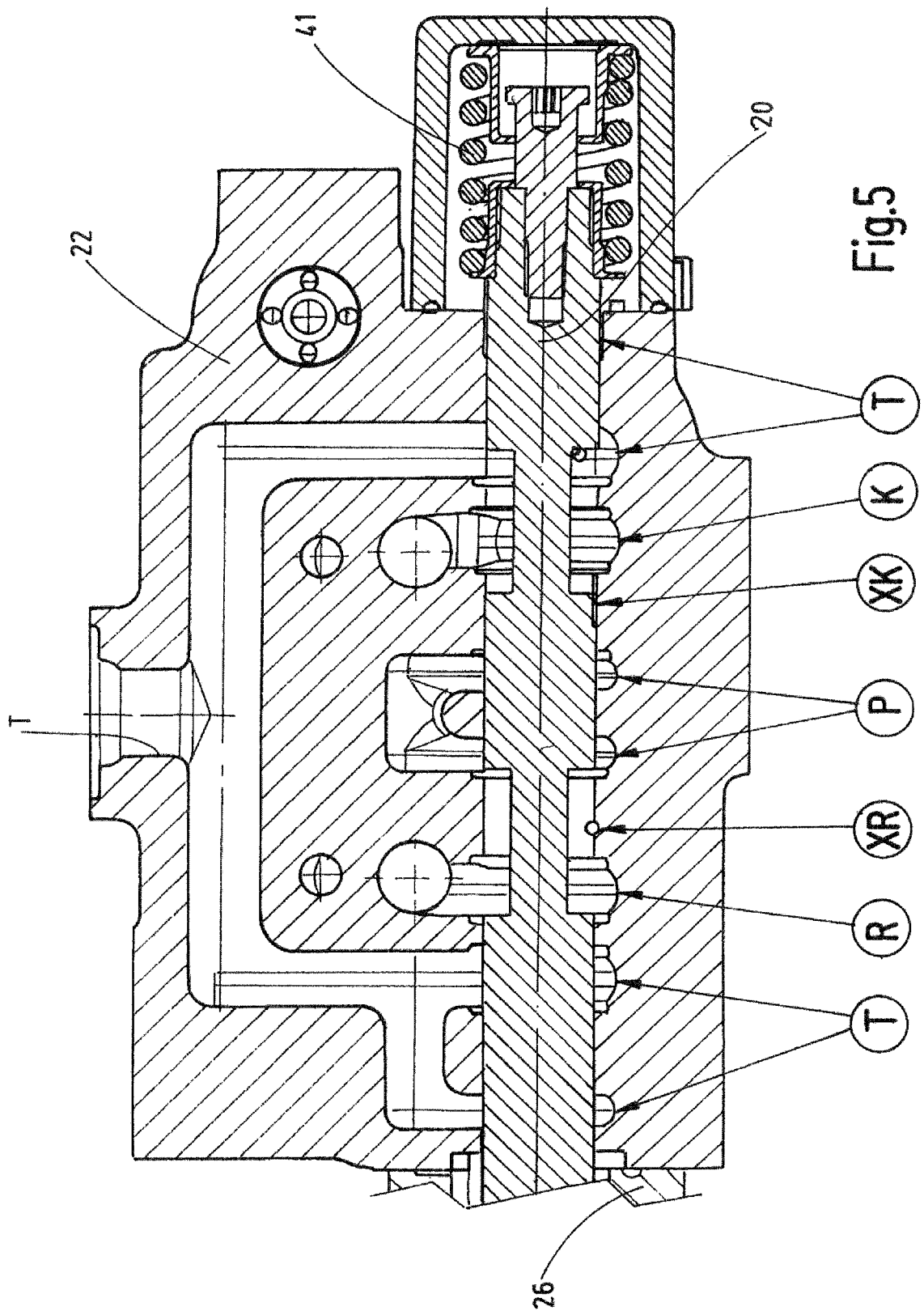
FIGS. 5 to 8 are partial side views in section of the valve housing, wherein the control spool is in the positions of "Charging of annular chamber," "Center position," "Charging of piston chamber," and "Lifting," respectively.
Figure 6:
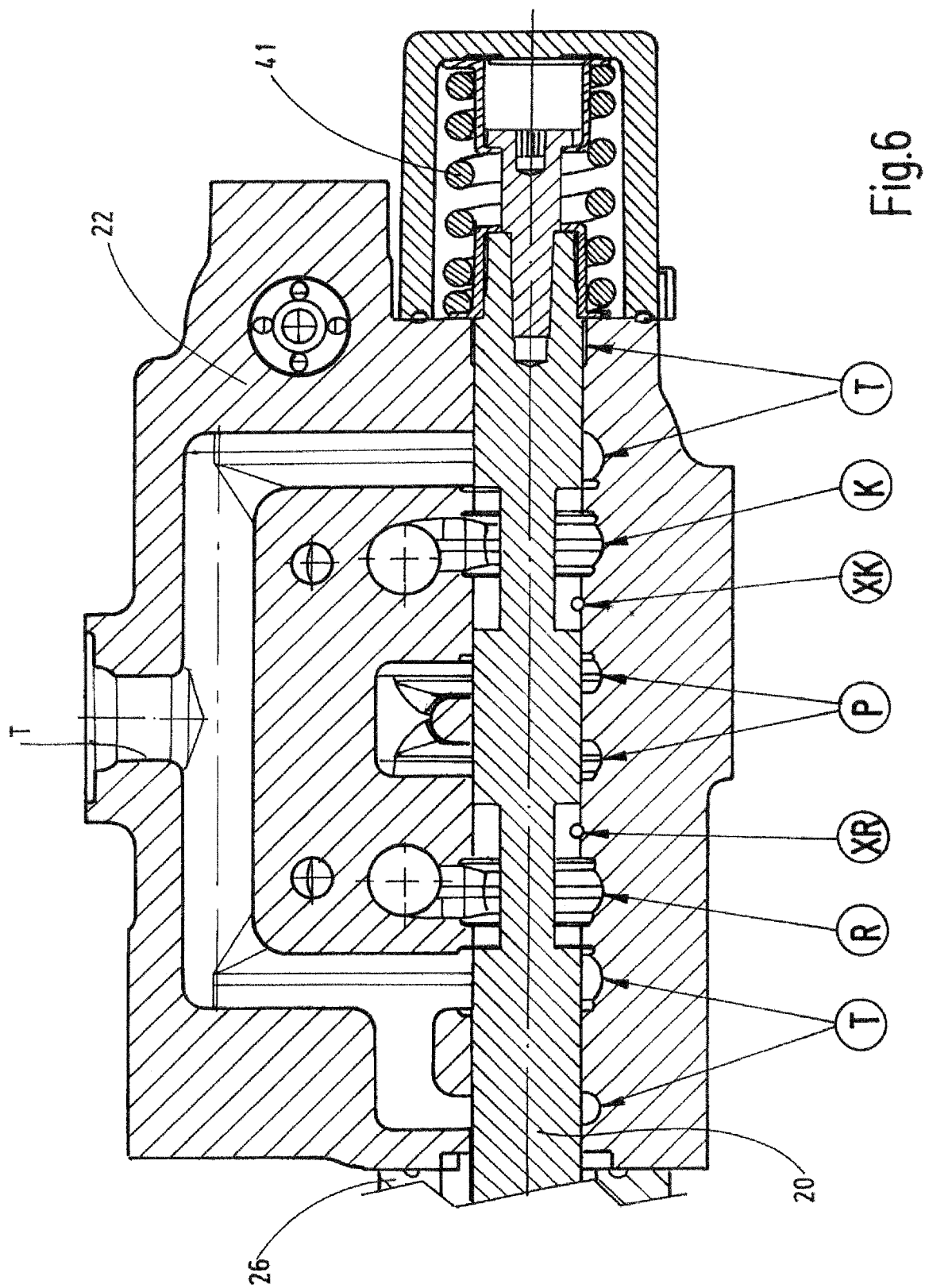

FIGS. 3b and 5 illustrate the position +1, shifted to the right of the center position by one step. In this case, the control port XK is connected to the return port T, such that the unlockable check valve 44 is locked or closed and the piston chamber 10 is only connected to the accumulator 12. However, the other control port XR is, like the utility port R, pressurized, so that it is connected to annular chamber 6 via the throttle check valve 46 and via the unlocked or opened check valve 42. At this position +1 the annular chamber 6 is therefore charged. According to the signals of the pressure sensors 58 and 60, the spring characteristics of cylinder 2 can be adapted to different load conditions or driving conditions of the vehicle by the corresponding pressurizing process.

Figure 7:
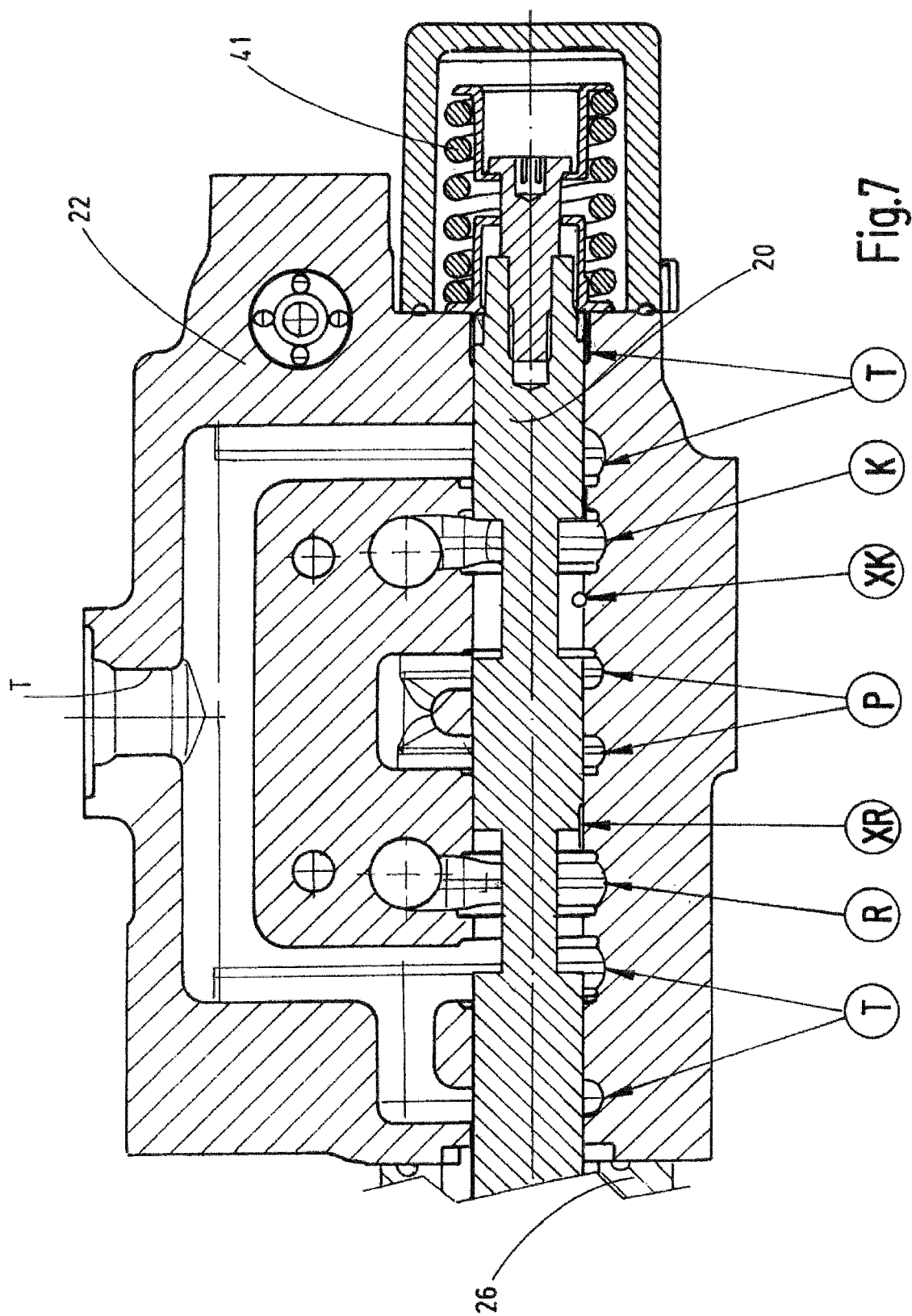

FIGS. 3d and 7 illustrate the position −1, shifted one step to the left starting from the center position, wherein the position −1 corresponds to the charging of the piston chamber 10 of the cylinder 2. In this case, the utility port K and the control port XK are pressurized, so that the unlockable check valve 44 in the second main branch 16 is unlocked or opened, whereas when the control line XR is de-pressurized and the utility port R is de-pressurized, the first main branch 14 is unlocked or opened. The annular chamber 6 of the cylinder 2 is only connected to the pressure accumulator 8. Thus, by charging the piston chamber 10, as in the switching position +1, the spring design of the cylinder 2 can be adapted to the requirements.

Figure 8:
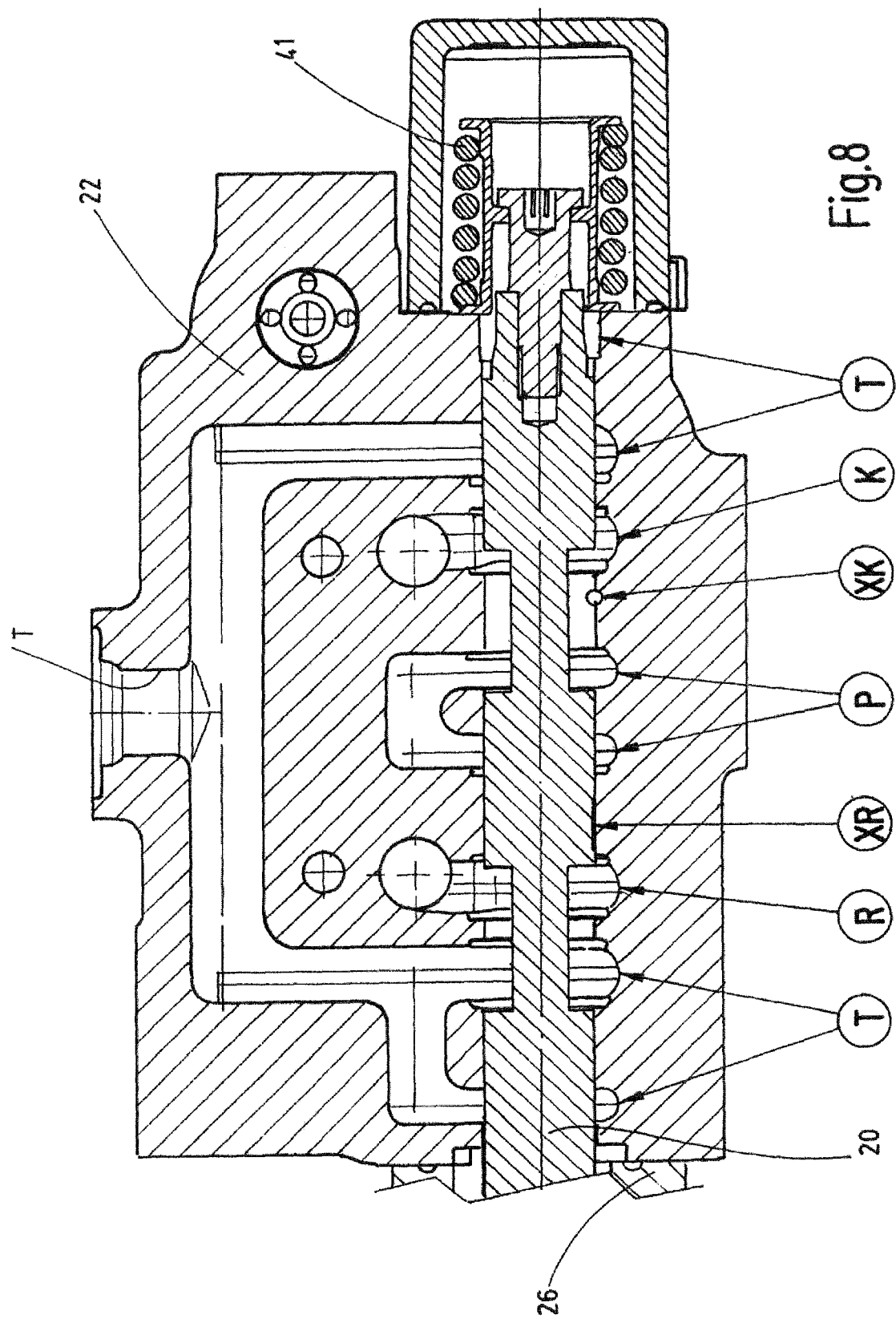

Finally, FIGS. 3e and 8 illustrate the position −2, starting at the center position shifted to the left by two steps. In this position the utility port K and both control ports XR and XK are pressurized. Both main branches 14 and 16 are then released via the unlocked or opened check valves 42 and 44. Because in this position the pressure supply port P of the inlet side is connected to the utility port K on the outlet side, the piston chamber 10 is pressurized via the throttle check valve 48 and the unlocked or opened check valve 44. Because the annular chamber 6 is connected to the utility port R via the unlocked or opened check valve 42 and the throttle check valve 46, and it in turn in conjunction with the utility port K is connected to the return port T, the switching position −2 corresponds to the function "lifting". In the control device according to the invention, all of these functions can be achieved by controlling only one motor 24.

While one embodiment has been chosen to illustrate the invention, it will be understood by those skilled in the art that various changes and modifications can be made therein without departing from the scope of the invention as defined in the claims.

The invention claimed is:

1. A control device, comprising:
a working cylinder having a piston-rod unit movable in a cylinder housing, the piston-rod unit dividing the cylinder housing into an annular chamber and a piston chamber;
a valve housing having a pressure supply port and a return port on an input side of the valve housing and having first and second utility ports and first and second control ports, the first and second utility ports being connectable in fluid communication with the annular chamber and the piston chamber, respectively;
first and second hydraulically unlockable valves connected in fluid communication the first and second control ports, respectively, between the working cylinder and the valve housing;
a control spool guided for longitudinal movement in the valve housing and biased by an energy store to a middle positon in the valve housing in which the first and second utility ports and the first and second control ports are blocked from fluid communication with the pressure supply port, the control spool being movable to first and second switching positions on a first side of the middle position retracting the piston-rod unit into the cylinder housing and charging the annular chamber, respectively and to third and fourth switching positions on a second side of the middle position charging the piston chamber and extending the piston-rod unit from the cylinder housing, respectively;
an electric motor actuating movement of the control spool in the valve housing from the middle position, the electric motor being controlled by control electronics; and
first and second hydraulic accumulators connected in fluid communication to the annular chamber and the piston chamber, respectively; and
a sensor detecting an operational state of the working cylinder and generating input signals received by the control electronics.

2. A control device according to claim 1 wherein
the second and third switching positions are adjacent the middle position of the control spool; and
the first and fourth switching positons are on side of the second and third switching positions remote from the middle position, respectively, of the control spool.

3. A control device according to claim 1 wherein
the first and second hydraulically unlockable valves comprise first and second check valves, respectively.

4. A control device according to claim 1 wherein
the energy store comprises a compression spring.

5. A control device according to claim 1 wherein
the valve housing comprises a load sensing port on the input side thereof.

6. A control device according to claim 1 wherein
the electric motor comprises a brushless DC motor coupled to and actuating the control spool via a rack and pinion drive.

7. A control device according to claim 1 wherein
the sensor detects displacements of the piston-rod unit in the cylinder housing.

8. A control device according to claim 1 wherein
the sensor detects rotational positions of the electric motor.

9. A control device according to claim 1 wherein
the sensor detects pressures in the annular chamber and the piston chamber.

10. A control device according to claim 1 wherein
in the first switching position the control spool connects the second utility port to the return port in fluid communication and connects the pressure supply port to the first utility port and the first and second control ports in fluid communication;
in the second switching position the control spool connects the return port to the second utility port and the second control port in fluid communication and connects the pressure supply port to the first utility port and the first control port in fluid communication;
in the third switching position the control spool connects the pressure supply port to the second utility port and the second control port in fluid communication and connects the return port to the first utility port and the first control port in fluid communication; and
in the fourth switching position the control spool connects the pressure supply port to the second utility port and the first and second control ports in fluid communication and connects the return port to the first utility port in fluid communication.

11. A control device according to claim 1 wherein
the first and second utility ports and the first and second control ports are on an output side of the valve housing.

* * * * *